US006587782B1

(12) United States Patent
Nocek et al.

(10) Patent No.: US 6,587,782 B1
(45) Date of Patent: Jul. 1, 2003

(54) METHOD AND SYSTEM FOR PROVIDING REMINDERS ABOUT POINTS OF INTERESTS WHILE TRAVELING

(75) Inventors: Tracey Nocek, Glendale Heights, IL (US); Cynthia Paulauskas, Chicago, IL (US)

(73) Assignee: Navigation Technologies Corp., Chicago, IL (US)

( * ) Notice: Subject to any disclaimer, the term of this patent is extended or adjusted under 35 U.S.C. 154(b) by 0 days.

(21) Appl. No.: 09/525,701

(22) Filed: Mar. 14, 2000

(51) Int. Cl.[7] .............................................. G01C 21/26
(52) U.S. Cl. ...................................................... 701/200
(58) Field of Search ..................... 701/23–25, 200–201, 701/206–216, 300–302; 342/350, 352, 355–356, 357.01–357.09, 357.11–357.15, 450–451, 457–458, 463–465; 340/988–996

(56) References Cited

U.S. PATENT DOCUMENTS

| 5,682,525 | A | * | 10/1997 | Bouve et al. ............. 707/104.1 |
| 5,767,795 | A | * | 6/1998 | Schaphorst ................. 340/988 |
| 6,009,403 | A | | 12/1999 | Sato |
| 6,026,375 | A | | 2/2000 | Hall et al. |
| 6,177,905 | B1 | | 1/2001 | Welch |
| 6,202,023 | B1 | * | 3/2001 | Hancock et al. ............. 701/201 |
| 6,259,381 | B1 | | 7/2001 | Small |
| 6,266,612 | B1 | | 7/2001 | Dussell et al. |

\* cited by examiner

*Primary Examiner*—Thu Nguyen
(74) *Attorney, Agent, or Firm*—Frank J. Kozak; Jon D. Shutter; Lawrence M. Kaplan

(57) ABSTRACT

A navigation system includes a feature that allows a user to specify a type of point of interest (or business chain) and then receive a reminder when the user is in proximity to a location of the point of interest of the specified type (or business chain) while traveling in a geographic region.

31 Claims, 11 Drawing Sheets

METHOD AND SYSTEM FOR PROVIDING REMINDERS ABOUT POINTS OF INTERESTS WHILE TRAVELING

BACKGROUND OF THE INVENTION

The present invention relates to navigation systems and more particularly the present invention relates to a feature in a navigation system that facilitates making stops at points of interest of a specified type while traveling.

Navigation systems are available that provide end users (such as drivers and passengers of the vehicles in which the in-vehicle navigation systems are installed) with various navigation-related functions and features. For example, some navigation systems are able to determine an optimum route to travel by roads between locations in a geographic region. Using input from the end user, and optionally from equipment that can determine one's physical location (such as a GPS system), a navigation system can examine various routes between two locations to determine an optimum route to travel from a starting location to a destination location in a geographic region. The navigation system may then provide the end user with information about the optimum route in the form of guidance that identifies the driving maneuvers required to be taken by the end user to travel from the starting location to the destination location. The guidance may take the form of visual and/or audio instructions that are provided along the way as the end user is traveling the route. Some navigation systems are able to show detailed maps on computer displays outlining routes to destinations, the types of maneuvers to be taken at various locations along the routes, locations of certain types of features, and so on.

In order to provide these and other navigating functions, navigation systems use geographic data. The geographic data may be in the form of one or more databases that include data that represent physical features in a geographic region. The geographic database may include data representing the roads and intersections in a geographic region and also may include information relating to the represented roads and intersections in the geographic region, such as turn restrictions at intersections, speed limits along the roads, street names of the various roads, address ranges along the roads, and so on.

Although navigation systems provide many important features, there continues to be room for new features or other improvements. One area in which there is room for improvement relates to making travel more convenient. A person can use a navigation system to identify points of interest of a particular type (e.g., restaurants) that are close to the person's location and receive guidance for traveling to any of the identified points of interest. This type of usage represents one kind of travel that persons commonly make but there are various other kinds of travel. For example, some kinds of locations do not have to be visited immediately. As an example, a person might want to stop at a post office (or other type of point of interest) sometime within the next several days when it is convenient to do so but would rather not make a special trip. Ideally, the person would prefer to make the stop at the post office while in route to another destination if the stop can be made without taking a significant additional amount of time.

Accordingly, there is a need for a feature in a navigation system that provides guidance about making stops at locations at the convenience of the user.

SUMMARY OF THE INVENTION

To address these and other objectives, the present invention comprises a method, system, and/or programming for providing a feature in a navigation system that allows a user to specify a type of point of interest and then receive a reminder when the user is in proximity to a point of interest of the specified type while traveling in a geographic region. The reminder is provided while the user is traveling to a location other than a point of interest of the specified type. This feature allows a user to make stops at points of interest of a particular type at the convenience of the user and when the user is close to the point of interest of a particular type, thereby minimizing travel time.

DETAILED DESCRIPTION OF THE PRESENTLY PREFERRED EMBODIMENTS

I. NAVIGATION SYSTEM—OVERVIEW

For purposes of this disclosure, a "navigation system" is understood to mean a navigation system used in a vehicle (i.e., an in-vehicle navigation system). A "navigation system" is also understood to mean any software application installed on a computer platform that provides navigation-related features and uses geographic data, including applications that are installed on personal computers, networks, portable electronic devices, and so on.

Figure 1:
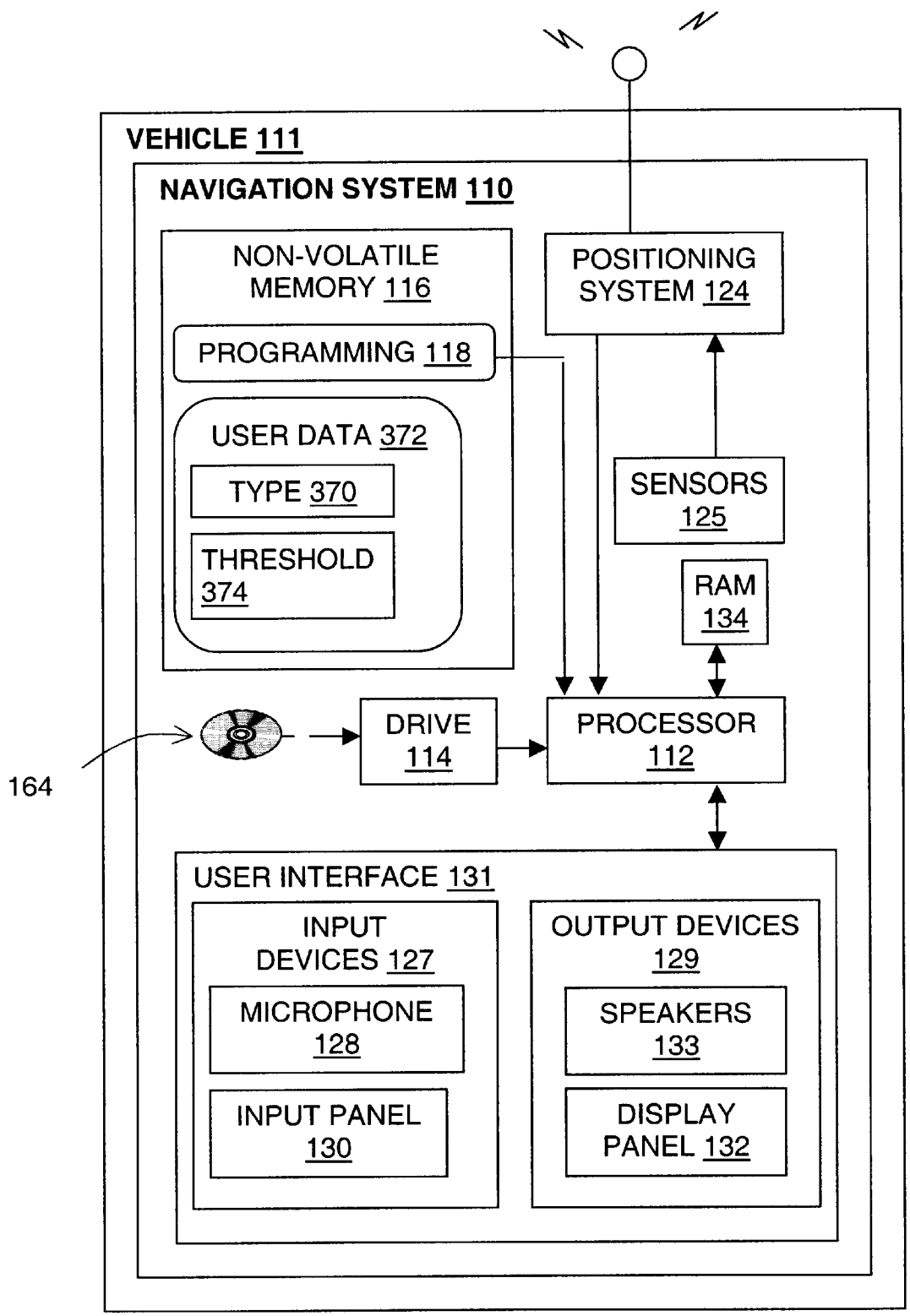
FIG. 1 is a block diagram showing components of an exemplary navigation system used in conjunction with a first embodiment of a feature that provides reminders about points of interest of a specified type while traveling.

Referring to FIG. 1, there is a block diagram of a navigation system 110. The navigation system 110 is installed in a vehicle 111, such as a car, bus, or truck, although in alternative embodiments, the navigation system 110 may be located outside of a vehicle or may be implemented in various other platforms or environments, as described below. The navigation system 110 is a combination of hardware and software components. In one embodiment, the navigation system 110 includes a processor 112, a drive 114 connected to the processor 112, and a non-volatile memory storage device 116 for storing programming 118 and possibly other information. The processor 112 may be of any type used in navigation systems.

The navigation system 110 may also include a positioning system 124. The positioning system 124 may utilize GPS-type technology, a dead reckoning-type system, or combinations of these or other systems, all of which are known in the art. The positioning system 124 may include suitable sensing devices 125 that measure the traveling distance, speed, direction, and so on, of the vehicle. The positioning system 124 may also include appropriate technology to obtain a GPS signal in a manner which is known in the art. The positioning system 124 provides an output to the processor 112. The output from the positioning system 124 is used by the software 118 that is run on the processor 112 to determine the location, direction, speed, etc., of the navigation system 110.

The navigation system 110 also includes a user interface 131. The user interface 131 includes appropriate equipment that allows the end user to input information into the navigation system. This input information may include a request to use the navigation features of the navigation system. For example, the input information may include a request for a route to a desired destination. The input information may also include other kinds of information. The equipment used to input information into the navigation system may include an input panel 130, such as a keypad, a keyboard, buttons, switches, etc., or a microphone 128, etc., as well as appropriate software, such as voice recognition programming. The user interface 131 also includes suitable equipment that provides information back to the end user. This equipment may include a display 132, speakers 133, or other means.

Figure 2:
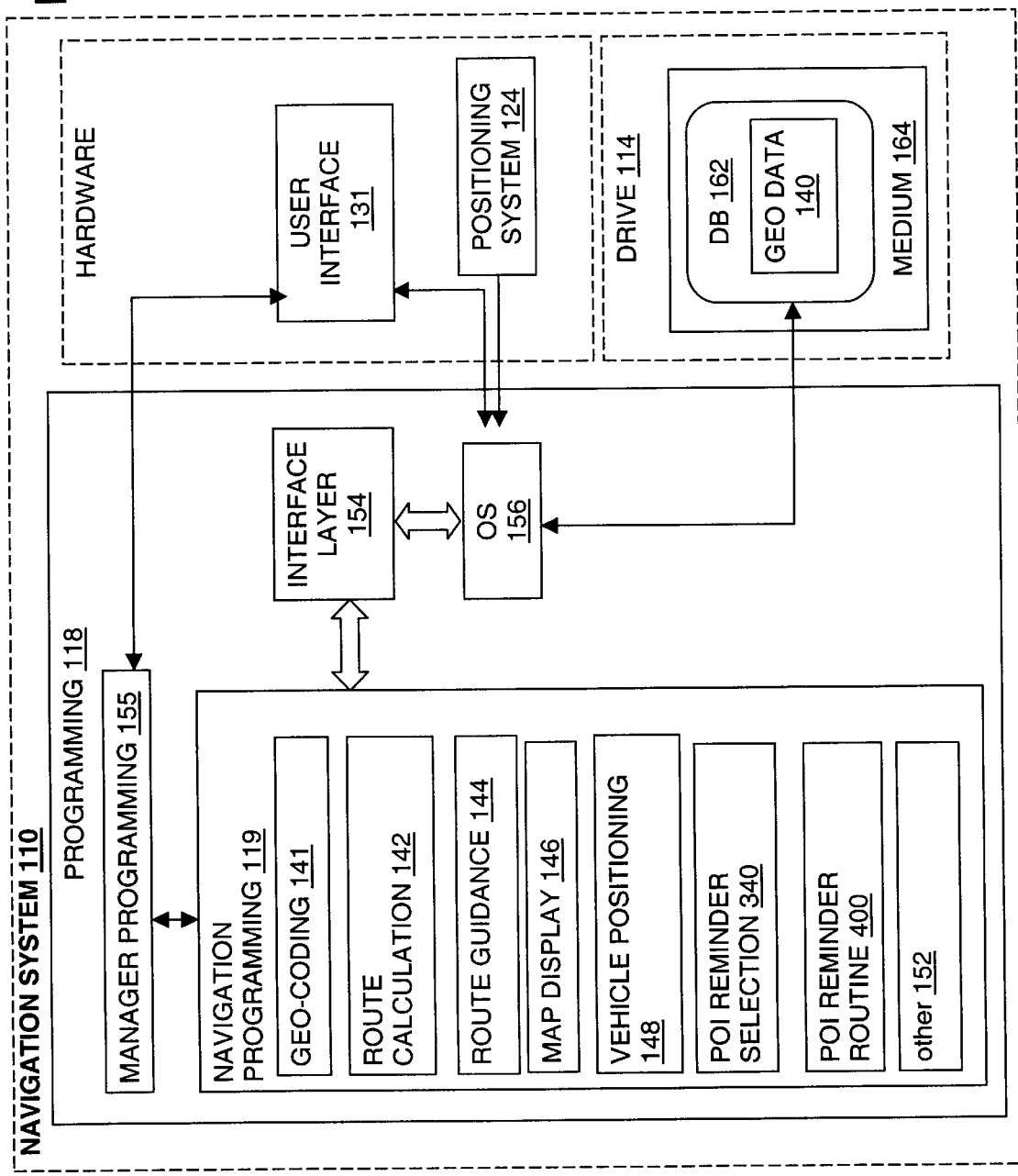
FIG. 2 is a block diagram showing portions of the navigation application programming in FIG. 1.

The programming 118 is loaded from the non-volatile memory 116 into a RAM 134 associated with the processor 112 in order to operate the navigation system. Referring to FIG. 2, the programming 118 includes navigation-related application software 119 that provides for the navigating functions and features of the navigation system 110. The navigation-related application software 119 uses geographic data 140, possibly in conjunction with the output from the positioning system 124, to provide various navigation features and functions. The navigation-related application software 119 may include separate component applications (also referred to as programs, subprograms, routines, or tools) that provide these various navigation-related features and functions.

FIG. 2 shows some of the component applications for one embodiment of the navigation-related software 119 included in the navigation system 110 of FIG. 1. These component applications may include a geo-coding application 141 (used for destination selection), a route calculation application 142, a route guidance 144 application (wherein detailed directions are provided for reaching a desired destination), a map display application 146, and a vehicle positioning application 148 (wherein a vehicle position is related to the geographic data 140). The applications 119 may include a point of interest reminder selection routine 340 and a point of interest reminder presentation routine 400 (which are explained in more detail below). The navigation-related software applications 119 may also include other component applications 152.

The component applications of the programming 118 may work together through defined programming interfaces. The navigation-related application software 119 may access the geographic data 140 directly, or alternatively, the navigation application software 119 accesses the geographic data 140 through an interface layer 154 and operating system 156. The interface layer 154 and operating system 156 may be part of the programming 118 or may be provided separately.

In addition to the navigation-related applications 119, the programming 118 may also include manager application software 155. The manager application software 155 provide interfaces to the hardware in the user interface 131 and the positioning system 124. The manager application software 155 may also coordinate requests for data from the navigation-related applications 119.

In one embodiment, the separate applications of the programming 118 are written in the C programming language although in alternative embodiments other programming languages may be used, such as C++, Java, Visual Basic, and so on.

II. THE GEOGRAPHIC MAP DATABASE
A. Overview.

Referring to FIG. 2, the geographic data 140 is organized into one or more databases 162 and stored on a storage medium 164. The storage medium 164 is installed in the drive 114 so that the geographic data 140 can be read and used by the navigation system. The storage medium 164 may be removable and replaceable so that a storage medium with an appropriate database 162 for the geographic region in which the vehicle is traveling can be used. In addition, the storage medium 164 may be replaceable so that geographic data 140 on it can be updated easily.

In one embodiment, the geographic data are provided by Navigation Technologies Corporation of Rosemont, Ill. However it is understood that the inventive concepts disclosed herein are not restricted to any particular source of data.

In one embodiment, the storage medium 164 is a CD-ROM disk. In an alternative embodiment, the storage medium 164 may be a PCMCIA card in which case the drive 114 would be replaced with a PCMCIA slot. Various other storage media may be used, including fixed or hard disks, DVD disks or other currently available storage media, as well as storage media that may be developed in the future. The storage medium 164 and the geographic data 140 do not have to be physically provided at the location of the navigation system. In alternative embodiments, the storage medium 164, upon which some or all of the geographic data 140 are stored, may be located remotely from the rest of the navigation system and portions of the geographic data provided via a communications link, as needed.

The map database 162 contains information about the roadway network in the geographic region. In one embodiment, the map database 162 includes node data and segment data. These data represent components of the physical road network. Node data represent physical locations in the geographic region (such as roadway intersections and other positions) and segment data represent portions of roadways between the physical locations represented by nodes. (The terms "nodes" and "segments" represent only one terminology for describing these physical geographic features and other terminology for describing these features is intended to be encompassed within the scope of these concepts.)

Because a navigation system uses geographic data in certain known and expected ways to perform known functions, the geographic data can be organized, structured, and/or arranged in ways that facilitate their use by the navigation system. Some of the ways that geographic data 140 can be can be organized, structured, or arranged in a geographic database are described in U.S. Pat. Nos. 5,968, 109, 5,974,419, and 5,953,722, the entire disclosures of which are incorporated by reference herein.

Figure 3:
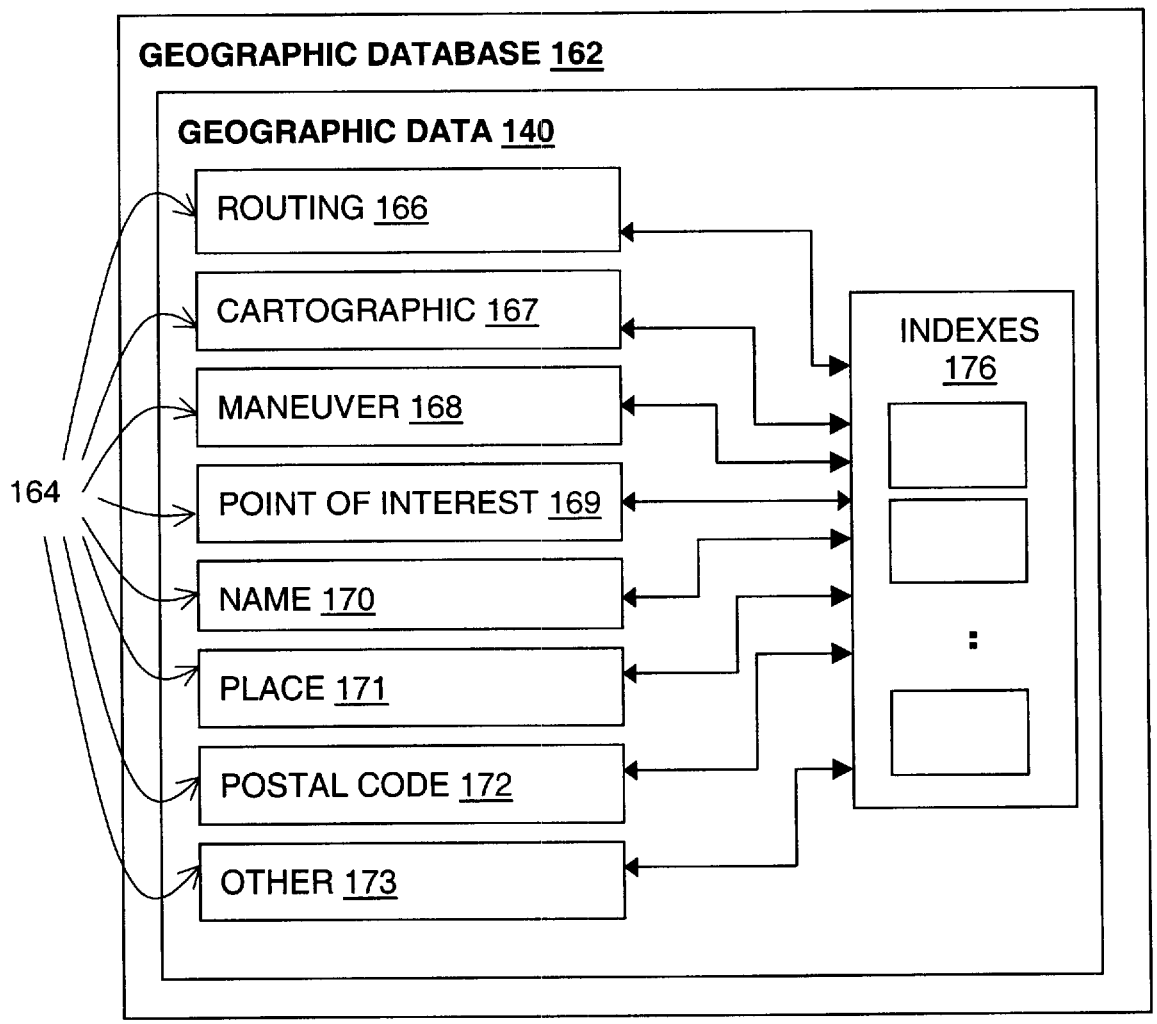
FIG. 3 is a block diagram illustrating some of the types of data contained in the geographic database shown in FIGS. 1 and 2.

FIG. 3 illustrates an organization of the geographic database 162. The organization shown in FIG. 3 represents one way that geographic data 140 can be organized in a database. Various other arrangements are possible and can be used. In FIG. 3, the geographic database 162 is shown to be comprised of separate subsets 164 of data. These subsets 164 include routing data 166, cartographic data 167 (for map display), maneuver data 168 (for route guidance), point-of-interest data 169 (for identifying specific points of interest, such as hotels, restaurants, museums, stadiums, airports, etc.), name data 170 (identifying the names of roads, places and other features), places 171 (e.g., cities, states, counties), postal codes 172 and other kinds of data 173. The geographic database 162 may be defined with different data types or with fewer or more data types.

Each subset 164 of geographic data 160 includes the data and associated attributes required to perform a particular navigation function but excludes data and attributes which are not needed to perform the function. There is some overlap of data between each of these subsets, with the result that some information may be included in more than one subset. For example, a data entity representing a road segment in the routing data 166 and a data entity representing the same road segment in the cartographic data 167 may include attributes identifying the nodes located at the ends of the road segment. Although this duplication may result in a larger overall data storage requirement, each of the navigation functions (i.e., the applications 119 in FIG. 2) benefits from the resultant efficiency of handling smaller amounts of data.

Although the organization of the geographic data 140 into different types provides for efficient use of the data by the different navigation functions, it is necessary to provide that the different functions that use these different data types work together. To permit these types 164 of data to work together, indexes 176 are included as part of the geographic database 162. The indexes 176 provide cross references, search trees, and/or other data finding techniques. The indexes 176 can be located external of any of the data types 164 or the indexes 176 may be located within any of the types 164 of data. In this embodiment of the geographic database 164, both internal and external indexes are used.

Figure 4:
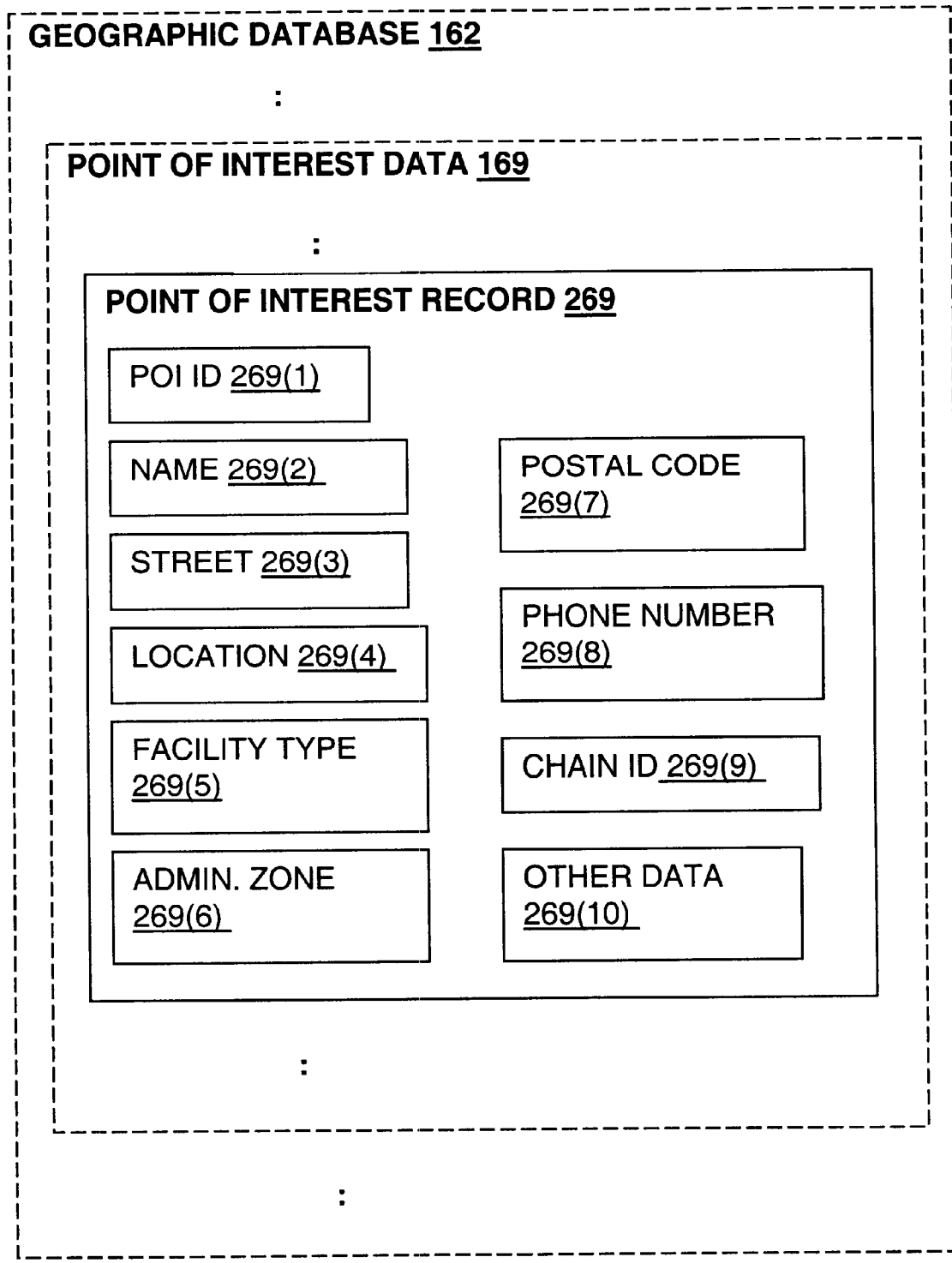
FIG. 4 is a block diagram illustrating some of the components of the point of interest data shown in FIG. 3.

FIG. 4 shows some of the kinds of information included in the point of interest data 169. The point of interest data 169 includes a plurality of data records 269 each of which includes data about a separate point of interest located in the coverage area of the geographic database 162. A point of interest record 269 includes a point of interest ID 269(1), name data 269(2), street data 269(3), location data 269(4), facility type data 269(5), administrative zone data 269(6), postal code data 269(7), phone number data 269(8), chain ID data 269(9), and possibly other data 269(10). The point of interest ID 269(1) includes a number or code by which the point of interest record 269 can be identified in the database 162. The name data 269(2) contains the name of the represented point of interest. The street data 269(3) contains the street address of the represented point of interest. The location data 269(4) contains an identification of a road segment data record in the routing data 166 that represents the road segment along which the represented point of interest is located or alternatively, the location data 269(4) may contain the geographic coordinates of the represented point of interest. The facility type data 269(5) contains data indicating the type of facility or business the represented point of interest is, e.g., restaurant, post office, antique store, city hall, convention center, automobile repair shop, gas station, ATM, sports facility, hotel, and so on. Within some of these types, the point of interest may include further classification data, e.g., type of restaurant (Chinese, Italian, etc.). The administrative zone data 269(6) contains the name of the municipality (e.g., city or town) and state of the represented point of interest. The postal code data 269(7) contains the appropriate postal code information (e.g., zip code in the U.S.) of the represented point of interest. The phone number data 269(8) contains the phone number of the represented point of interest. If the represented point of interest is part of a business chain, the point of interest record contains data in a chain ID data 269(9) that identifies the business chain.

Figure 5:
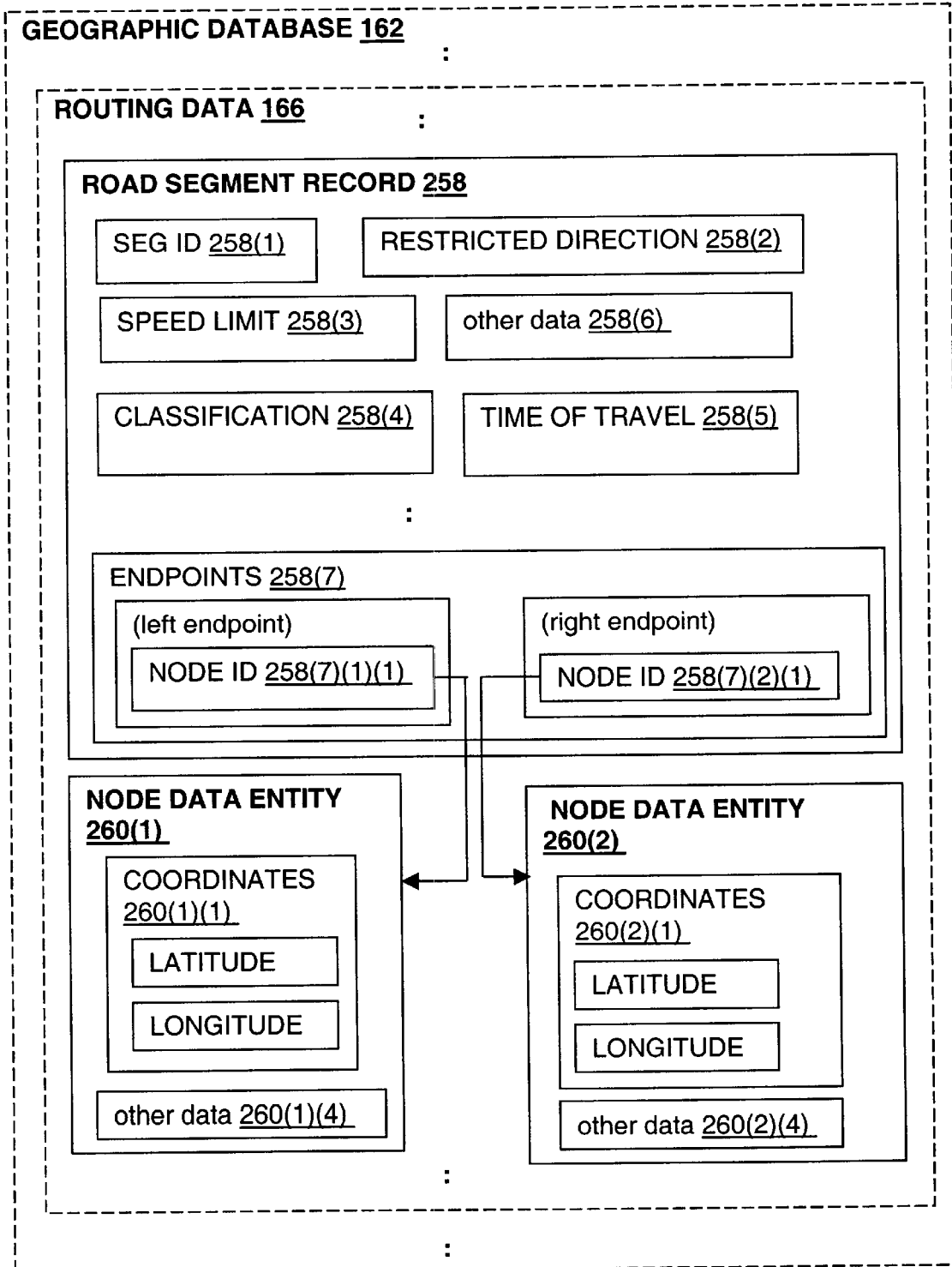
FIG. 5 is a block diagram illustrating some of the components of the routing data shown in FIG. 3.

FIG. 5 shows some of the kinds of information included in the routing data (166 in FIG. 3). The routing data 166 includes a plurality of road segment data records 258 each of which includes data about a separate road segment located in the coverage area of the geographic database 162. A road segment record 258 includes a segment ID 258(1) by which the data record can be identified in the geographic database 162. The road segment data record 258 may also include data 258(2) that indicates the restrictions, if any, on the direction of vehicular travel permitted on the represented road segment. The road segment data record 258 includes data 258(3) that indicates a speed limit or speed category (i.e., the maximum permitted vehicular speed of travel on the represented road segment). The road segment data record 258 may also include data 258(4) indicating whether the represented road segment is part of a controlled access road (such as an expressway), a ramp to a controlled access road, a bridge, a tunnel, a toll road, a ferry, and so on. The road segment data record 258 may also include data 258(5) indicating a travel time which indicates an estimated amount of time to travel along the road segment. The travel time data 258(5) may be expressed in seconds or may be expressed in arbitrary units. The travel time data 258(5) may include separate travel times for each direction of travel along the segment. The travel time data 258(5) may include separate travel times for different times of day, day of week, etc.

The road segment data record 258 also includes data 258(7) providing the geographic coordinates (e.g., the latitude and longitude) of the endpoints of the road segment. In one embodiment, these data 258(7) contain references to the node data records 260(1) and 260(2) that represent the nodes corresponding to the endpoints of the represented road segment.

The road segment record 258 may also include or be associated with other data 258(6) that refer to various other attributes of the represented road segment. For example, the road segment data record may include data identifying what turn restrictions exist at each of the nodes which correspond to intersections at the ends of the road portion represented by the road segment, the name or names by which the represented road segment is known, the street address ranges along the represented road segment, and so on. The various attributes associated with a road segment may be included in a single road segment record, or preferably are included in more than one type of road segment record which are cross-referenced to each other.

III. PROXIMITY CONVENIENCE REMINDERS
A. Overview.

Embodiments of the disclosed navigation system feature provide reminders (audible, visual, or both) to a navigation system user when the user is close to a point of interest (e.g., type of business, facility, location, etc.) of a type that had been previously identified by the user. These reminders are provided while the user is traveling in a geographic area. These reminders are provided regardless of whether the navigation system is being used to receive driving instructions to travel to a destination. Thus, the user may be following his/her own route and not receiving driving instructions from the navigation system. Alternatively, the user may be receiving driving instructions to travel to a destination other than a point of interest of the previously identified type. Reminders may be accompanied with an option to provide route guidance to one of the points of interest of the specified type that are identified as being close to the user's current location.

B. Selecting Point of Interest Types for Reminders.

Figure 6:
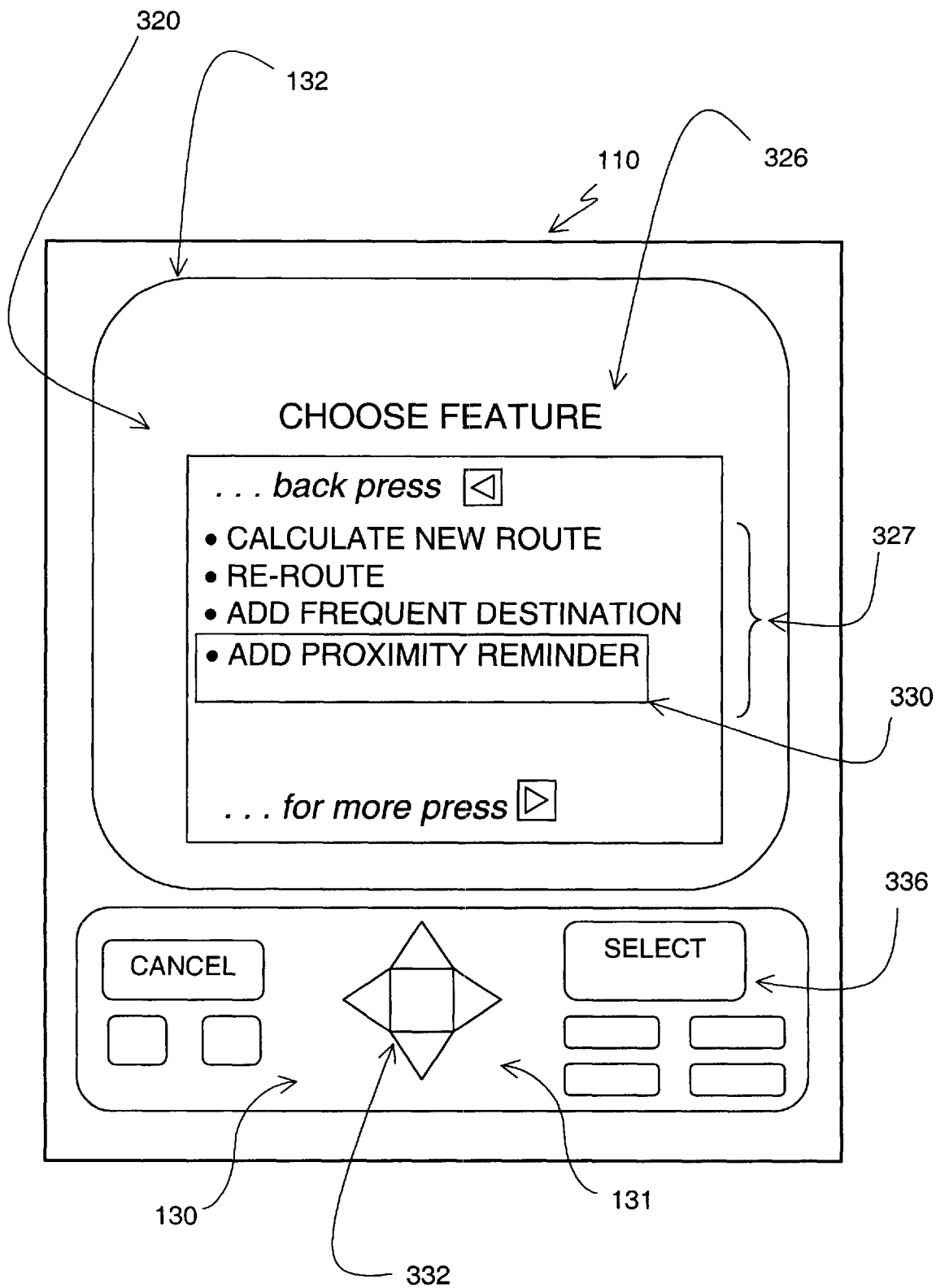
FIG. 6 shows the navigation system display screen of FIG. 1 with a menu for selecting the point of interest reminder feature.

FIG. 6 shows a menu 320 on the display 132 of the navigation system 110. The menu 320 presents a plurality of available features 327. The user is prompted by a message 326 to choose one of the available features 327. One of the features is highlighted with an outlining box 330. The user can manually press a toggle 332 on the keypad 130 of the user interface 131 to move the outlining box 330 up or down in order to change the feature highlighted with the outlining box 330. When the outlining box 330 is on the feature that the user wants to choose, the user presses another key to select the highlighted feature. For example, the user may press a "SELECT" key 336. In FIG. 6, the feature labeled "ADD PROXIMITY REMINDER" is highlighted with the outlining box 330 and the user can select this item by pressing the "SELECT" key 336. (Other features that are available on this menu 320 include calculating a new route to a new destination and calculating alternative routes to the existing destination.) When the user selects the feature "ADD PROXIMITY REMINDER", the point of interest selection routine (340 in FIG. 2) is called. The point of interest selection routine 340 is included among the applications 119 in the navigation system 110.

Figure 7:
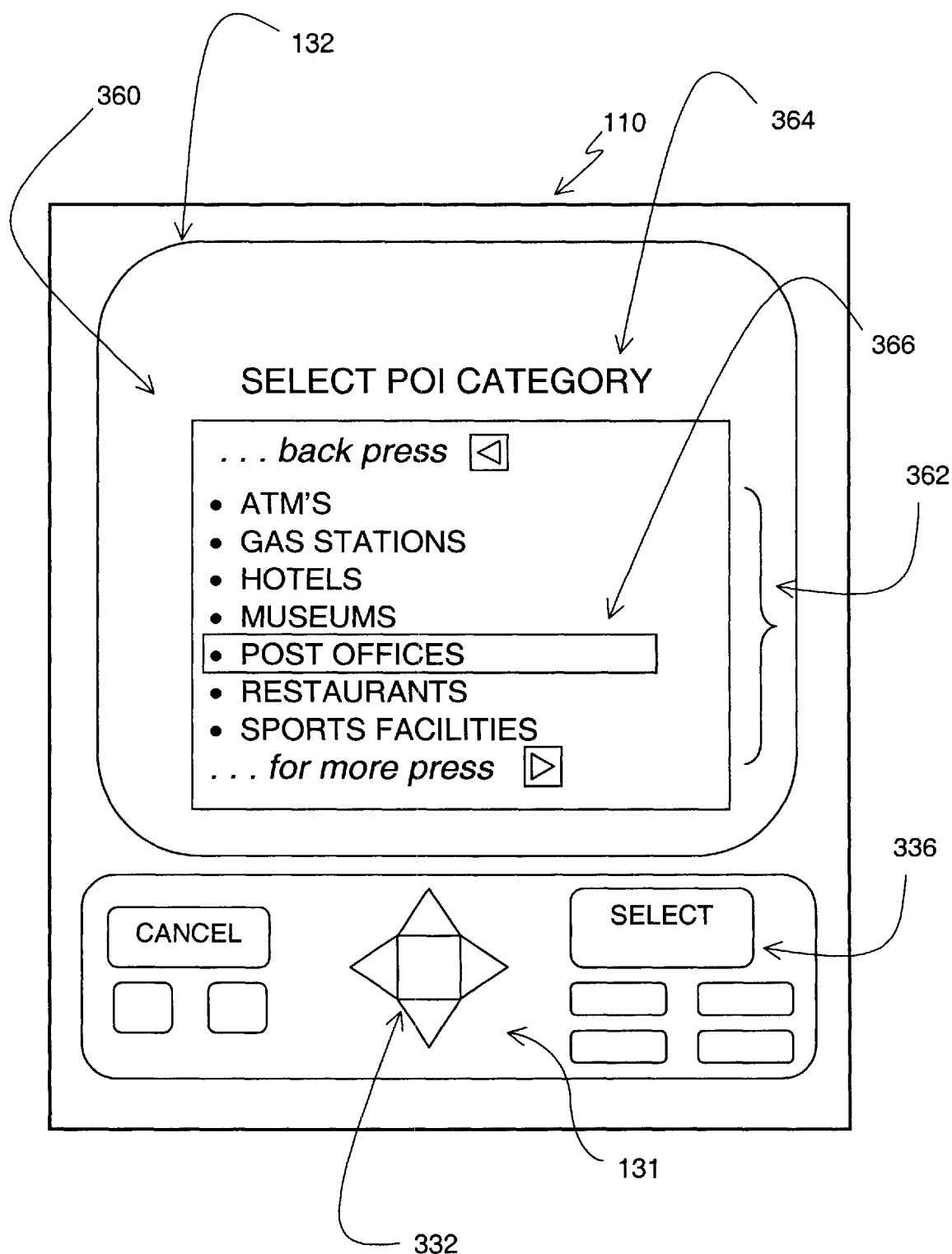
FIG. 7 shows the display screen of the navigation system with a menu for selecting a category of points of interest for which reminders are desired.

FIG. 7 shows a menu 360 on the display 132. The menu 360 includes a list of a plurality of different categories (or types) 362 of points of interest. The list of point of interest categories is generated by the point of interest selection routine 340 using the facility type data (269(5) in FIG. 4) from the point of interest data 169 from the geographic database 162. The point of interest selection routine 340 also provides a message 364 prompting the user to select a category (or type) of point of interest. One of the categories is highlighted with an outlining box 366. In the embodiment of FIG. 7, the "POST OFFICES" category is highlighted with the outlining box 366. If the user wishes to change the category highlighted with the outlining box 366, the user can manually press the toggle 332 of the user interface 131 to move the outlining box 366 up or down. In response to the message 364, the user operates the controls on the user interface 131 (e.g., pressing the "SELECT" key 336) to select one of the types of points of interest for which proximity reminders are desired. Referring to FIG. 1, when a point of interest category type is selected, the point of interest selection routine 340 causes data indicating this point of interest type to be stored in a user data portion 372 of the non-volatile storage 116 of the navigation system 110. These data 370 remain in the non-volatile storage 116 even when the navigation system and vehicle are turned off so that the data 370 are available whenever the navigation system is being used.

According to one embodiment, the user may select the points of interest for which reminders are provided by chain instead of by point of interest type. If the user chooses to have point of interest reminders provided by chain, reminders will be provided whenever the user is in proximity to a location of an establishment of that particular chain. For example, the user may want to be reminded when he/she is close to a McDonald's restaurant. When point of interest reminders are selected by chain, the chain ID data (269(9) in FIG. 4) are used by the point of interest selection routine 340 in a similar manner as the facility type data were used, as described above.

C. Selecting Thresholds.

According to some embodiments, the proximity reminder feature is configured with a threshold parameter. The threshold parameter may be a threshold distance. When configured with a threshold distance, the navigation system identifies all the points of interest of the specified type to the user that are within the threshold distance of the present location of the user while the user is traveling in the geographic area.

According to other embodiments, the threshold parameter is a threshold travel time. When configured with a threshold travel time, the navigation system identifies all the points of interest of the specified type to the user that can be reached within the threshold travel time from the present location of the user while the user is traveling in a region taking into account the travel times of roads located around the user.

In addition to distance thresholds and travel time thresholds, other types of threshold parameters may be used. For example, a threshold parameter may combine distance and travel time. According to this alternative, a point of interest which is close (as the crow flies), would be eliminated if the amount of time required to reach it exceeded a time of travel threshold.

In alternative embodiments, a dynamic threshold parameter can be used. A dynamic threshold parameter takes into account current factors when determining whether any points of interest of the specified type are in proximity to the user's current position. For example, a dynamic threshold may take into account the type of road that the vehicle is traveling on, the vehicle's current speed, the time of day, the day of week, the hours of operation of the point of interest, and so on. The dynamic threshold may also take into account the duration of time for which the reminder has been set.

Figure 8:
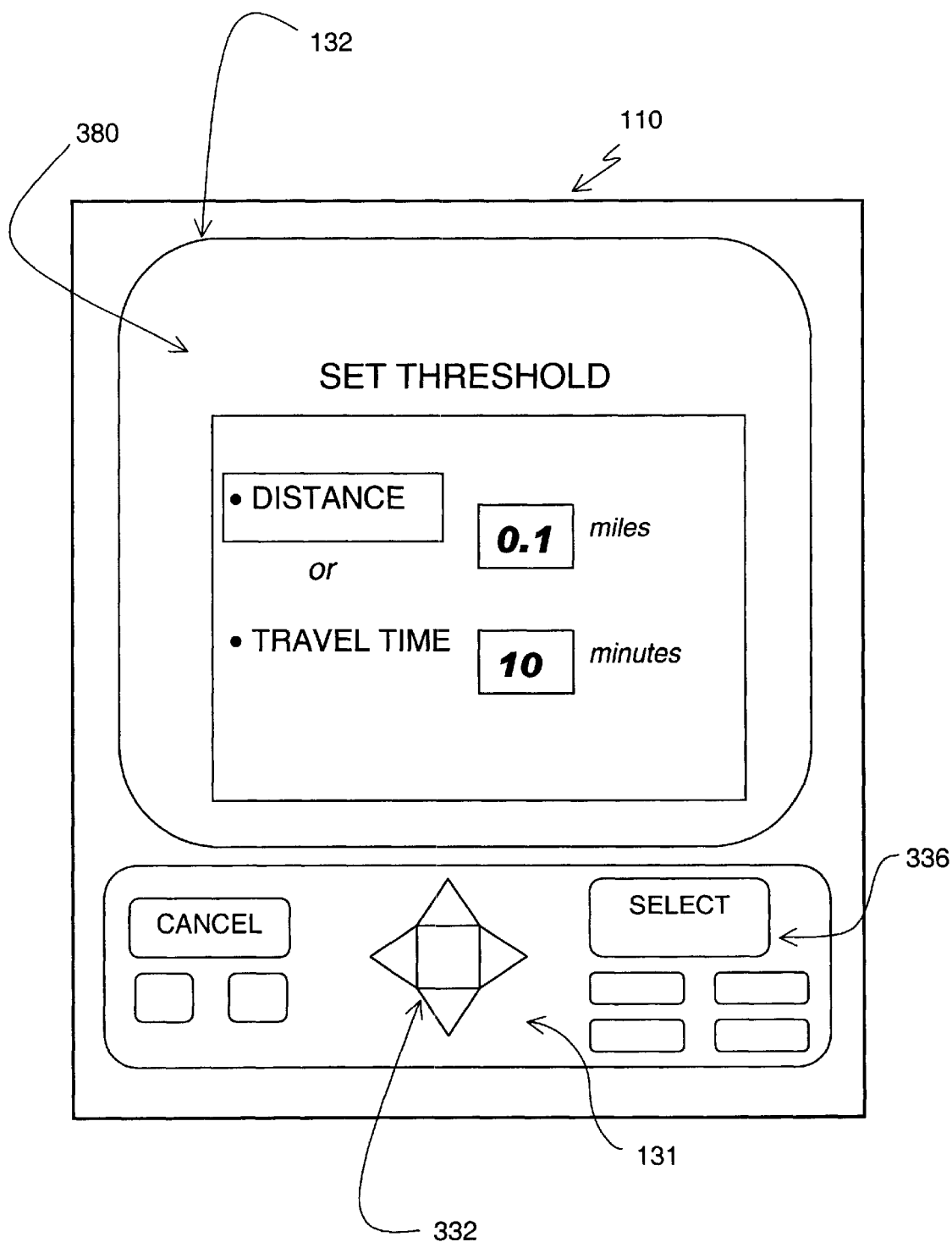
FIG. 8 shows the navigation system display screen of FIG. 1 with a menu for configuring the threshold of the point of interest reminder feature.

According to some embodiments, the threshold parameters (e.g., distance and/or travel time) may be user-configurable. FIG. 8 shows a menu 380 on the display 132 that can be used for configuring the threshold parameter and/or threshold travel time. If the user does not specify a threshold parameter, a default threshold parameter may be used.

According to one embodiment, a user can specify different thresholds for different types of points of interest. For example, a 1 mile distance threshold can be set for post offices and a 5 mile distance threshold can be set for gas stations.

Referring to FIG. 1, when a threshold of any type is selected, data 374 indicating the threshold are stored in the user data portion 372 of the non-volatile storage 116 of the navigation system 110. These data 374 remain in the non-volatile storage 116 even when the navigation system and vehicle are turned off.

D. Operation.

Figure 9:
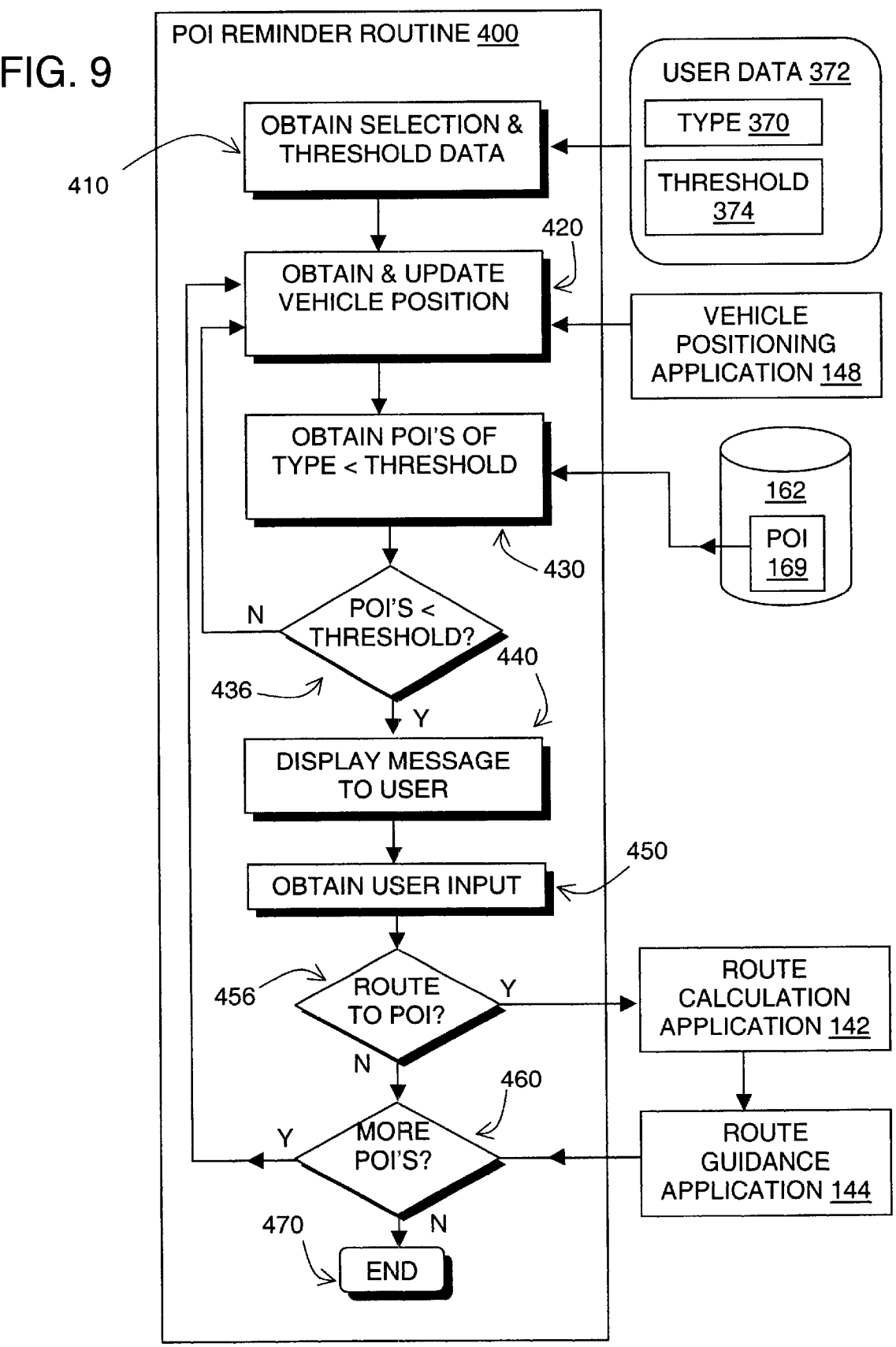
FIG. 9 is a flowchart showing steps performed by the point of interest reminder routine in FIG. 2.

As stated above, after the user has selected a point of interest category type (or chain) and, optionally, a threshold, data 370 and 374 indicating these selections are stored in the non-volatile memory 116. When these data 370 and 374 are stored in the non-volatile memory 116, the point of interest (POI) proximity reminder routine (400 in FIG. 2) is run. A flowchart showing a general process of the POI proximity reminder routine 400 is shown in FIG. 9. The POI proximity reminder routine 400 runs in the background and is configured so as not to interfere with other higher priority processes that are being performed by the navigation system 110.

Referring to FIG. 9, a first step 410 of the POI proximity reminder routine 400 obtains the POI category type selection data 370 and the threshold data 374, if any, from the user data 372. Then, the routine obtains data indicating the current vehicle position (Step 420). Data indicating the current vehicle position are obtained from the vehicle positioning application 148 (shown in FIGS. 2 and 9). Using the POI category type data 370, the threshold data 374, and the vehicle position data, the process searches the point of interest data 169 in the geographic database 162 to identify all the points of interest of the selected type that are within the specified threshold of the current vehicle position (Step 430). (Note that if a travel time threshold or other type of threshold other than a distance threshold is used, the process may call other routines to identify the points of interest of the selected type that are within the applicable threshold from the current vehicle position.)

Figure 10:
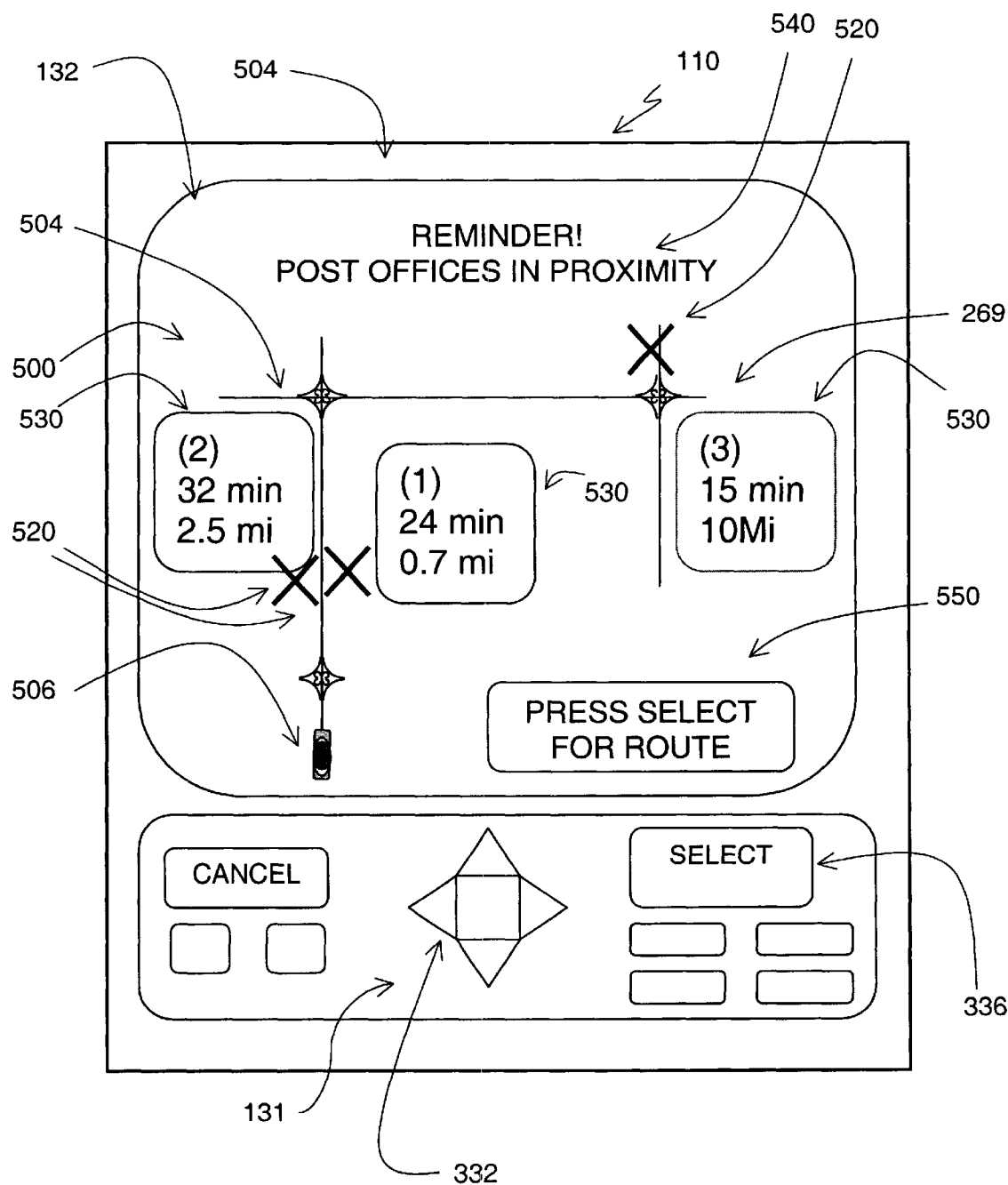
FIG. 10 shows the display screen of the navigation system with a presentation of data provided by the point of interest reminder routine according to the process of FIG. 9.

If there are no points of interest of the selected type within the threshold from the current vehicle position, the process loops back to the step of obtaining an updated vehicle position (Step 436). However, if there are points of interest of the selected type within the threshold from the current vehicle position, the process 400 displays information to the user identifying the points of interest and requests the user whether route guidance to any of the identified points of interest is desired (Step 440). FIG. 10 shows an image 500 provided by the POI proximity reminder routine 400 on the display 132 of the navigation system 110 for these purposes.

In FIG. 10, the image 500 contains a map 504 of the roads in the area around the vehicle. An image 506 of the vehicle is superimposed on the map image 504. Also superimposed on the map image 504 are images 520 indicating the locations of points of interest of the specified type relative to the road network and the vehicle. Associated with each image of the location of the points of interest are data 530 indicating data about the respective point of interest. For example, the data 530 may indicate the distance to the point of interest from the current position of the vehicle and/or the travel time to the point of interest from the current position of the vehicle.

The image 500 also includes a message 540 indicating to the user that one or more points of interest of the specified type are in proximity to the current position of the vehicle. The message 540 may also include an indication of the type of point of interest category being displayed. In the example shown in FIG. 10, the message 540 states "REMINDER! POST OFFICES TN PROXIMITY."

In the embodiment of FIG. 10, the image 500 also includes a message 550 prompting the user to indicate whether he/she would like route guidance to any of the indicated points of interest. If the user wants route guidance to one of the indicated points of interest, he/she can so indicate by pressing the "SELECT" key 336. Otherwise, the user can indicate that he/she does not want route guidance to any of the indicated points of interest by pressing the "CANCEL" key or by waiting a few seconds without responding which is taken by the POI reminder routine 400 as a negative response.

Referring again to FIG. 9, if the user does not want to be guided to any of the indicated points of interest, the POI proximity reminder routine 400 obtains an indication from the user whether reminders about additional points of interest of the specified type should be provided during the current driving session if any such additional points of interest of the specified type are encountered (Step 460). If the user indicates that no more reminders are desired, the POI proximity reminder routine 400 stops operating for the remainder of the driving session or until it is restarted (Step 470). On the other hand, if the user indicates that reminders about additional points of interest are desired, the process loops back to the step (Step 420) to obtain a new vehicle position.

Figure 11:
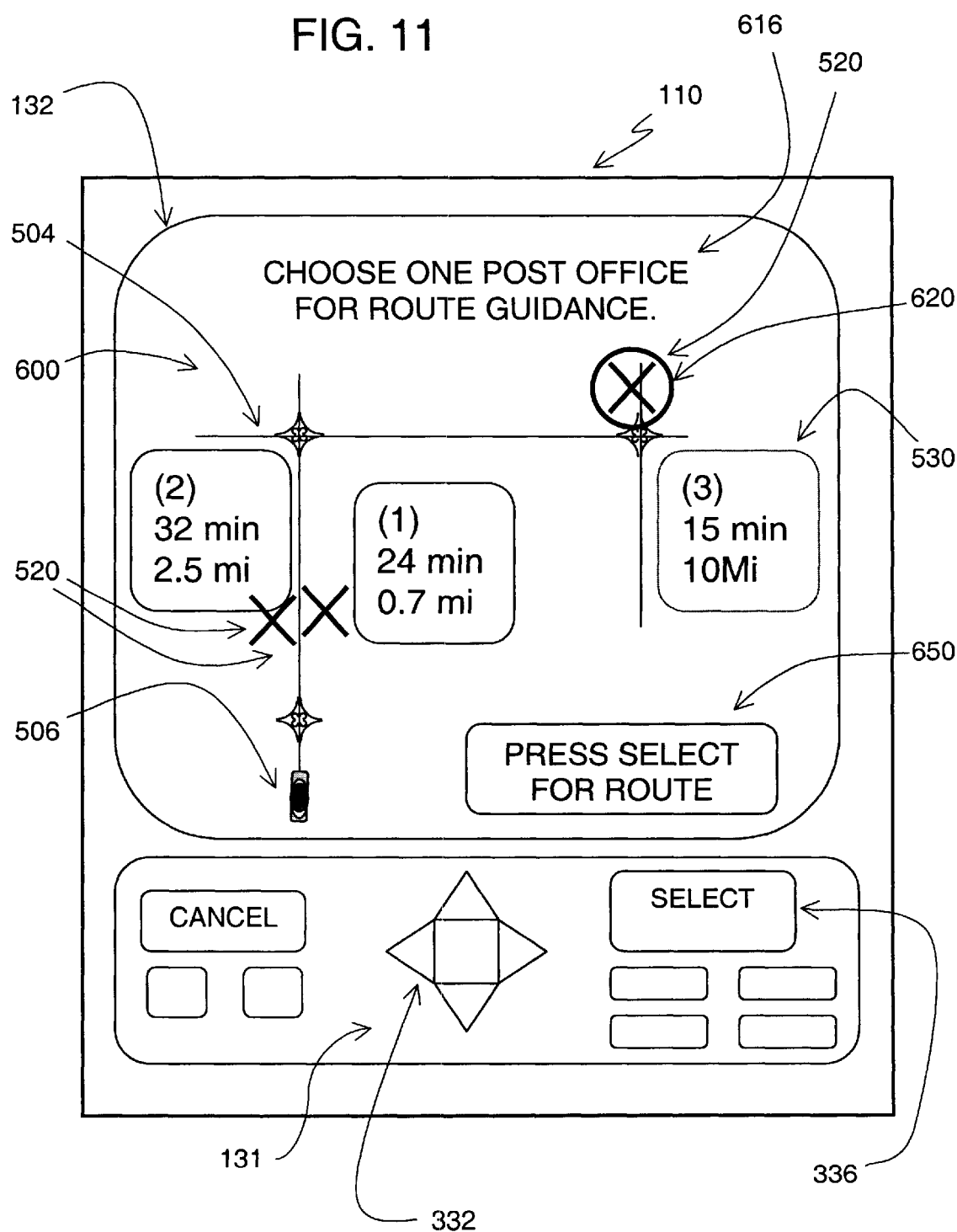
FIG. 11 shows the display screen of the navigation system with a message provided by the point of interest reminder routine of FIG. 9 prompting the user to select a point of interest to which route guidance is to be provided.

Referring back to Step 456 in FIG. 9, if the user responds positively to the message (550 in FIG. 10) indicating that he/she wants route guidance to one of the indicated points of interest, the POI proximity selection routine 400 prompts the user to select one of the points of interest to which route guidance will be provided. FIG. 11 shows an image 600 provided by the POI proximity reminder routine 400 on the display 132 of the navigation system 110 for this purpose. In FIG. 11, the image 600 contains the map 504, the image 506 of the vehicle, and images 520 of the points of interest.

The image 600 also includes a message 616 indicating to the user that one point of interest of the specified type is to be selected. In the example shown in FIG. 11, the message 616 states "CHOOSE ONE POST OFFICE FOR ROUTE GUIDANCE." Associated with an image of one of the point of interest locations is a highlighting box 620. The highlighting box 620 can be moved from one image 520 of a point of interest to another by appropriate manipulation of the user interface controls (e.g., toggle 332). In the embodiment of FIG. 11, the image 600 also includes a message 650 indicating to the user to press the "SELECT" key 336 to obtain route guidance for the point of interest associated with the highlighting box 620.

When the highlighting box 620 is associated with the desired point of interest, the user selects the point of interest by pressing the "SELECT" key 336. When the user has selected one of the points of interest, the POI proximity reminder routine 400 calls the route calculation application 142 and the route guidance application 144 to provide the user with guidance for traveling to the selected point of interest. After the user has been guided to the selected point of interest, the POI proximity reminder routine 400 obtains input from the user indicating whether the user would like to continue obtaining reminders about this type of point of interest. If the user indicates positively, the POI proximity reminder routine 400 loops back to the step of obtaining a new vehicle position. Otherwise, if the user indicates negatively, the POI proximity reminder routine 400 stops. In addition, if the user had been receiving guidance for traveling to a destination before receiving the reminder about being in proximity to a POI of a selected type, the POI proximity reminder routine 400 obtains input from the user indicating whether the user would like to resume traveling to the destination. If the user responds affirmatively, the POI proximity reminder routine 400 calls the route calculation application 142 and the route guidance application 144 to calculate a route from the location of the POI to the destination and provide the user with guidance for following the route.

If only one point of interest of the specified type is found in proximity to the current vehicle position, the step of having the user choose one point of interest for which route guidance is to be provided can be omitted.

In alternative embodiments, the POI proximity reminder routine 400 can be used to obtain reminder about more than one type of point of interest. If reminders are desired about more than one type of point of interest, the different types of points of interest can be displayed together or alternatively, the different types of points of interest can be displayed separately, e.g., one after the other.

E. Alternative Embodiments

The POI proximity reminder feature is described as being included in a navigation system. A navigation system can be a vehicle navigation system or any software application installed on a computer platform that provides navigation-related features and that uses geographic data. The POI proximity reminder feature can be provided on platforms including personal computers, networks (including wireless networks and the Internet), personal digital assistants, PalmPilot®-type devices, cellular telephones (including any type of portable telephone that uses any type of technology, such as PCS/GSM, and so on), pagers and other portable electronic devices.

The equipment that determines the location of the device that provides the POI proximity reminder feature can be located locally with the device or remotely. As described above, the equipment that determines the location of the device that provides the POI proximity reminder feature can include GPS equipment located locally with the device. Alternatively, the location of the device that provides the POI proximity reminder feature can be determined remotely using technologies like those used for determining locations of cellular phones in an area. There are various available technologies that provide this feature. Some of the companies that provide this type of technology include ArrayComm, Inc., Harris Corporation, Corsair Communications, Lockheed Martin Corporation, CELLTRAX, Inc., TruePosition, Inc., Cell-Loc Inc., KSI Inc., and U.S. Wireless Corporation. Some of these technologies can be used to locate a cellular phone user who dials an emergency number, e.g., "911." Any such technology that is presently available or that becomes available in the future may be suitable.

In another alternative embodiment, a proximity reminder feature in a navigation system can incorporate real-time information. With real-time information, the proximity reminder feature can provide a user with reminders about aspects of places that change relatively quickly. For example, according to this embodiment, the proximity reminder feature in a navigation system can be used to provide a user with a reminder when the user is close to a gas station at which the gasoline price is less than a certain user-specified amount. To incorporate real-time information, the navigation system receives real-time data from a data provider. The navigation system may receive this data via a wireless communications link. The real-time data relate to points of interest or other places in a geographic area. The points of interest or other places to which the real-time data relate may already be represented in the database used by the navigation system or alternatively, the real-time data may relate to new points of interest or places that are not already represented in the database used by the navigation system. The proximity reminder feature uses the real-time data in conjunction with the data indicating the locations of places to which the real-time data relate to determine when the user is close to a location to which the real-time data relate. For example, if the real-time information indicates the price of gasoline at gas stations in an area, the proximity reminder feature filters the data representing gas station points of interest to determine those gas stations offering gasoline below the user's specified threshold price and then provides a reminder to the user when the user is in proximity to one of the gas stations. Real-time information can be used by the proximity reminder feature in a navigation system for various other changeable aspects of points of interest. For example, real-time information can be used by the proximity reminder feature in a navigation system to remind the user when he/she is close to a hotel room less than a specified price. Real-time information can also be used by the proximity reminder feature in a navigation system to remind the user when he/she is close to a cinema at which a user-specified movie is showing. Real-time information can also be used by the proximity reminder feature in a navigation system to remind the user when he/she is close to a business at which a sale is underway.

It is intended that the foregoing detailed description be regarded as illustrative rather than limiting and that it is understood that the following claims including all equivalents are intended to define the scope of the invention.

We claim:

1. A method of operation for a navigation system, the method comprising the steps of:

accepting identification by a user of a category of location type about which a reminder is desired;

using a geographic database to determine locations at which the identified category of location type are located in a geographic region;

later, while the user is traveling in the geographic region to a location other than a location of the identified category of location type, continuing to determine new current positions of the user;

comparing each new current position of the user as the user is traveling in the geographic region to locations of the category of location type identified by the user;

determining if one of the new current positions of the user is within a proximity threshold of any one of the locations of the category of location type identified by the user; and informing the user with a reminder if one of the new current positions of the user is determined to be within the proximity threshold to one of the locations of the identified category of location type.

2. The method of claim 1 wherein the navigation system is installed in a vehicle.

3. The method of claim 1 further comprising the step of:

providing the user with guidance to follow a route to the one of the locations of the category of location type located within the proximity threshold to the user.

4. The method of claim 1 wherein the step of determining comprises comparing distances between each new current position of the user to positions of locations of the category of location type identified by the user.

5. The method of claim 1 wherein the step of determining comprises comparing distances between each new current position of the user to positions of locations of the category of location type identified by the user; and wherein the step of informing is performed if any of said distances is less than the proximity threshold.

6. The method of claim 5 wherein said proximity threshold is configurable by the user.

7. The method of claim 1 wherein the step of determining comprises comparing travel times between each new current position of the user to positions of locations of the category of location type identified by the user.

8. The method of claim 1 wherein the step of determining comprises comparing travel times between each new current position of the user to positions of locations of the category of location type identified by the user; and wherein the step of informing is performed if any of said travel times is less than the proximity threshold.

9. The method of claim 8 wherein said proximity threshold is configurable by the user.

10. The method of claim 1 further comprising the step of:
storing data indicating said identification in a memory storage device associated with said navigation system, wherein said memory storage device is capable of retaining said data while said navigation system is not being used.

11. The method of claim 1 wherein said step of informing is performed while said user is traveling in a vehicle in which said navigation system is installed.

12. The method of claim 1 wherein said navigation system uses the geographic database to determine if the user is within the proximity threshold to a location of the category of location type identified by the user.

13. The method of claim 1 wherein said geographic database is installed with said navigation system.

14. The method of claim 1 wherein said step of informing continues to be performed while the user remains within said proximity threshold to a location of the identified category of location type.

15. The method of claim 14 wherein said step of informing ceases after the user is no longer within the proximity threshold of a location of the identified category of location type.

16. The method of claim 1 further comprising:
when performing the step of informing the user, also informing the user of the category of location type.

17. The method of claim 1 further comprises:
prior to the step of accepting identification, providing the user with categories of location types.

18. The method of claim 1 further comprising:
if said user is in within the proximity threshold of more than one location of the identified category of location type, informing the user that more than one location of the identified category of location type is within the proximity threshold; and
providing additional information about each location of the identified category of location type which is within the proximity threshold.

19. The method of claim 1 further comprising:
receiving real-time data relating to the category of location type; and
using the real-time data in conjunction with data relating to locations of the category of location type when determining if the user is within the proximity threshold to a location of the category of location type.

20. The method of claim 19 wherein the real-time data relates to one of: gasoline prices, hotel room prices, and movies.

21. A method of operation for a navigation system, the method comprising the steps of:
accepting an identification by a user of a business chain about which a reminder is desired when the user is in proximity thereto;
later, continuing to determine new current positions of the user while the user is traveling in a geographic region, using a geographic database to determine locations of the business chain in the geographic region;
comparing each new current position of the user while the user is traveling in the geographic region to locations of the business chain identified by the user;
determining if one of the new current positions of the user is within a proximity threshold of any one of the locations of the business chain; and
informing the user with a reminder if one of the new current positions of the user is within the proximity threshold of one of the locations of the business chain.

22. The method of claim 21 wherein the navigation system is installed in a vehicle.

23. The method of claim 21 further comprising the step of:
providing the user with guidance to follow a route to the one of the locations of the business chain located within the proximity threshold to the user.

24. The method of claim 21 wherein the step of determining comprises comparing distances between each new current position of the user to positions of locations of the business chain identified by the user.

25. The method of claim 21 wherein the step of determining comprises comparing travel times between each new current position of the user to positions of locations of the business chain identified by the user.

26. The method of claim 21 further comprising the step of:
storing data indicating said identification in a memory storage device associated with said navigation system, wherein said memory storage device is capable of retaining said data while said navigation system is not being used.

27. The method of claim 21 wherein said step of informing is performed while said user is traveling in a vehicle in which said navigation system is installed.

28. The method of claim 21 wherein said step of informing continues to be performed while the user remains within said proximity threshold of a location of the identified business chain.

29. The method of claim 21 further comprising:
when performing the step of informing the user, also informing the user of the business chain to which the user is within the proximity threshold of.

30. The method of claim 21 further comprising:
if the user is within the proximity threshold of more than one location of the identified business chain, informing the user that more than one location of the identified business chain is within the proximity threshold; and
providing additional information about each location of the business chain which is within the proximity threshold.

31. The method of claim 21 further comprising:
receiving real-time data relating to the business chain; and
using the real-time data in conjunction with data relating to locations of the business chain when determining whether the user is within the proximity threshold of a location of the business chain.

* * * * *